US007000811B2

(12) United States Patent
Gilstrap et al.

(10) Patent No.: US 7,000,811 B2
(45) Date of Patent: Feb. 21, 2006

(54) HANDLEBAR/STEM MOUNTED BICYCLE WHEEL HOLDING DEVICE

(76) Inventors: Keith Gilstrap, 1818 Colorado Ave., #103, Glenwood Springs, CO (US) 81601; Doug Golenz, 942 Sunflower St., Louisville, CO (US) 80027

( * ) Notice: Subject to any disclaimer, the term of this patent is extended or adjusted under 35 U.S.C. 154(b) by 169 days.

(21) Appl. No.: 10/613,339

(22) Filed: Jul. 2, 2003

(65) Prior Publication Data
US 2005/0001406 A1    Jan. 6, 2005

(51) Int. Cl.
*B62J 11/00* (2006.01)
(52) U.S. Cl. .................. 224/420; 224/42.24; 224/421; 224/453; 224/457; 224/463
(58) Field of Classification Search ............ 224/42.24, 224/420, 421, 424–427, 452, 453, 454, 457, 224/458, 463
See application file for complete search history.

(56) References Cited

U.S. PATENT DOCUMENTS

| 577,910 | A | | 3/1897 | Bierbach |
|---|---|---|---|---|
| 660,616 | A | * | 10/1900 | Bauer ........................ 224/425 |
| 672,540 | A | | 4/1901 | Speir |
| 1,069,160 | A | * | 8/1913 | Meltz ........................ 224/420 |
| 1,203,398 | A | | 10/1916 | Perkins |
| 1,234,409 | A | | 7/1917 | Strifler |
| 1,442,285 | A | | 1/1923 | McKay et al. |
| 1,577,792 | A | | 3/1926 | Duck et al. |
| 1,839,997 | A | | 1/1932 | Rutledge |
| 1,886,549 | A | | 11/1932 | Howell et al. |
| 3,338,484 | A | | 8/1967 | Hall, Sr. |
| 4,437,597 | A | | 3/1984 | Doyle |
| 4,440,332 | A | * | 4/1984 | Kullen ........................ 224/421 |
| 4,730,758 | A | * | 3/1988 | McMurtrey ................. 224/421 |
| 5,085,360 | A | | 2/1992 | Fortune et al. |
| 5,242,183 | A | | 9/1993 | Oberg et al. |
| 5,353,973 | A | * | 10/1994 | McMurtrey ................. 224/420 |
| 5,405,113 | A | * | 4/1995 | Jaw ............................ 224/425 |
| 5,437,171 | A | | 8/1995 | Owen |
| 5,467,906 | A | | 11/1995 | Forman |
| 5,558,261 | A | | 9/1996 | Hedeen |
| 5,588,661 | A | | 12/1996 | Wolfe |
| 5,639,001 | A | | 6/1997 | Brady |
| 5,678,796 | A | | 10/1997 | James |
| 5,692,659 | A | | 12/1997 | Reeves |
| 5,702,040 | A | | 12/1997 | Hedeen |
| 5,779,119 | A | | 7/1998 | Talbot et al. |
| 5,810,231 | A | | 9/1998 | Kravitz |
| 5,836,492 | A | | 11/1998 | Allen |
| 6,336,649 | B1 | | 1/2002 | Lin |
| 6,523,848 | B1 | * | 2/2003 | Liu ............................. 280/293 |

* cited by examiner

*Primary Examiner*—Gary E. Elkins
(74) *Attorney, Agent, or Firm*—Leyendecker & Lemire, LLC; Kurt Leyendecker

(57) ABSTRACT

A wheel holding device for attaching to one or both a handlebar or a stem of a bicycle is described. In one embodiment, the device holds and secures the front wheel of a bicycle that has been removed from the bicycle's front fork for use when transporting the bicycle on a rooftop carrier of an automobile.

28 Claims, 3 Drawing Sheets

HANDLEBAR/STEM MOUNTED BICYCLE WHEEL HOLDING DEVICE

RELATED APPLICATIONS

U. S. Pat. 6,817,502 entitled "Bicycle Wheel Holde" filed on Aug. 23 2002; patent application Ser. No. 10/613,343 entitled "Sealpost Mounted Bicycle Wheel Holding Device" filed concurrently with this application; and patent application Ser. No. 10/613,338 entitled "Bicycle Wheel Bag" also filed concurrently with this application are all commonly owned along with this application and are hereby incorporated by reference in their entirety herein.

FIELD OF THE INVENTION

This invention relates generally to a device for holding a bicycle wheel. More specifically, the invention relates to a device removably mountable to one or both of a stem and handlebar of a bicycle for carrying a bicycle wheel such as during transport of the bicycle.

BACKGROUND

Many types of rooftop bicycle carriers (or racks) require the front wheel of a bicycle be removed when mounting the bicycle on the carrier. The front wheel is typically stowed in the vehicle or is secured to the rooftop carrier using a separate fixture that clamps to the wheel at its axle. As can be appreciated, the wheel may be dirty, especially if the wheel is from a mountain bike, and putting a dirty wheel in the vehicle is often undesirable. The separate wheel fixtures that mount directly to the carrier are also often undesirable because they can be expensive and take up limited rooftop space that could otherwise be used to carry additional bicycles.

Several wheel holders have been proposed to secure the front wheel while the bicycle is being transported on a rooftop carrier. In U.S. Pat. No. 5,588,661 of Wolfe, a bracket is disclosed that is affixed to the rear dropout of a bicycle frame. When the bicycle is placed in the rooftop carrier, the axle of the front wheel is secured into a slot provided in the bracket by tightening the wheel's quick release mechanism. The bracket has several drawbacks. First, it is not easily removable from the bicycle and is intended to remain on the bicycle adding unnecessary weight. Second, since the front wheel is supported at the axle on only one side of the axle, the stress on the axle from the weight of the wheel and wind load during transport could cause damage to the axle and the wheel's hub.

In U.S. Pat. No. 5,779,119 of Talbot, a wheel holder is disclosed that is secured onto the seatpost of a bicycle and includes an extension arm with spaced fingers extending therefrom. The fingers have slots formed in their distal ends and the slots are adapted to receive the axle of the bicycle's front wheel. The holder requires the use of a clamping mechanism to secure it to the seatpost. While Talbot clamping mechanism may be effective in attaching the holder to the bicycle's seatpost, it requires several interconnected moving parts that increase the total cost to produce the holder, especially when compared to a holder with an attachment mechanism that does not include interconnected moving parts. Further, since the fingers of the Talbot holder are shorter than the radius of the front wheel, the extension arm of the holder must be passed through the spokes of the intended bicycle wheel so that the spaced slots can be aligned with the ends of the wheel's axles. As can be appreciated, passing the extension arm through the spokes with the slotted fingers that extend perpendicularly therefrom can be awkward especially when the associated front wheel includes closely spaced spokes. Finally, the design of the Talbot holder requires the device to extend generally in a direction generally perpendicular to the bicycle. Given this configuration, the wheel and the end of the extension arm could interfere with the mounting of additional bicycles onto an associated rooftop carrier, especially when more than two bicycles are to be transported by a single carrier.

SUMMARY OF THE INVENTION

In a first preferred embodiment, a device for securing a bicycle wheel to a bicycle is described. The device comprises a generally u-shaped form having first and second arm portions extending from a base portion. The arm portions are spaced from each other proximate the base portion a sufficient distance to permit a handlebar stem of the bicycle to fit therebetween. The first and second arm portions terminate in first and second ends. The first and second ends are spaced from each other with the first end having a first dropout attached to it, and the second end having a second dropout attached to it. The first dropout includes a first slot and the second dropout includes a second slot, wherein the first and second slots are substantially aligned with each other and are adapted to receive the ends of an axle of the bicycle wheel therein.

In a second preferred embodiment, a device for attaching a bicycle wheel to a bicycle comprises (i) a generally V-shaped portion including two legs, (ii) first and second support arm portions, and (iii) first and second dropouts. Each support arm portion intersects with an end of one of the legs of the V-shaped portion at a proximal end forming a first angle. Each support arm portion extends from the proximal end to a distal end. The first dropout portion is attached to the distal end of the first support arm portion, and the second dropout portion is attached to the distal end of the second support arm portion, each of the first and second dropout portions include a slot formed therein for receiving a portion of an axle of the bicycle wheel. The slot of the first dropout portion is substantially aligned with the slot of the second dropout portion.

In a third preferred embodiment, a device for attaching a bicycle wheel to a bicycle comprises (i) a framework adapted to brace against one or both a stem or handlebar of the bicycle without a clamping mechanism having interconnected moving parts, and (ii) a wheel attachment mechanism coupled with the framework for securing the bicycle wheel to the device.

In a fourth preferred embodiment, a method of attaching a bicycle wheel to the stem or handlebar of a bicycle is described. The method comprises bracing a wheel attachment device against at least one of a handlebar stem and a handlebar of the bicycle; and securing the bicycle wheel to the wheel attachment device.

Numerous other embodiments and variations of the embodiments are also contemplated as is provided in this specification including the appended claims and as would be obvious to one of ordinary skill in the art with the benefit of this disclosure.

DETAILED DESCRIPTION

A device for attaching to one or both of a stem and handlebar of a bicycle and holding a bicycle wheel is described. Accordingly, the device can be utilized to hold a front wheel of a bicycle when the bicycle with the front wheel removed from the front fork dropouts is mounted on a rooftop carrier of an automobile for transport. In one preferred embodiment, the device comprises a wireform having two spaced and opposed dropouts to receive the ends of an axle of a bicycle wheel therein. The wireform of the preferred embodiment is adapted for quick attachment to the stem and/or handlebar of the bicycle. Further, the bicycle wheel is held in front of the handlebar in a position that does not interfere with the mounting of additional bicycles on the carrier. This maximizes the number of bicycles that can be carried on a single carrier, especially when compared to a rooftop carrier utilizing separate fixtures to hold the front wheels.

Terminology

The term "or" as used in this specification and the appended claims is not meant to exclusive rather the term is inclusive meaning "either or both".

ONE PREFERRED EMBODIMENT

Figure 1:
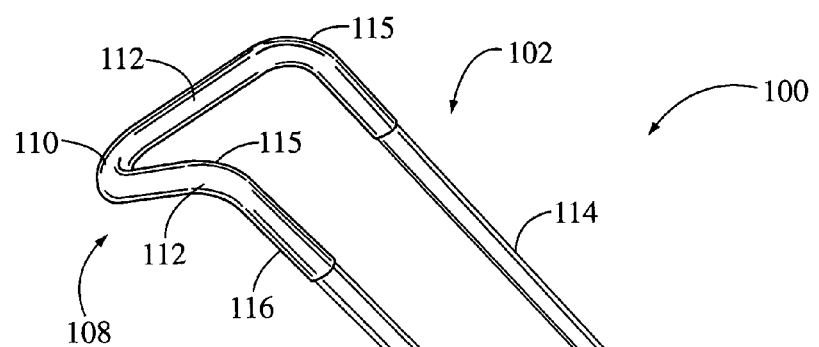
FIG. 1 is an isometric view of a preferred embodiment of the wheel holding device.

FIG. 1 is an illustration of one preferred embodiment of the device 100. The device includes (i) a form or framework typically including a wireform 102 generally comprised of specifically bent and formed metallic rod and (ii) dropouts 104 attached to ends of the wireform for receiving the ends of an axle of a bicycle wheel therein. The metallic rod is typically steel having a diameter of about 0.375"–0.50", although in variations, the material could comprise an aluminum alloy, titanium alloy or other metal. Further, although the rod is typically cylindrical, other cross-sectional shapes can be utilized. The rod may be solid or tubular. Additionally, in a variation, the rod could be comprised of a plastic material reinforced with glass fibers, graphite fibers or another suitable reinforcing material. While the rod can be bent into the illustrated configuration, the wireform can also be cast, forged, or molded as well.

Referring to FIG. 1, the wireform 102 includes a V-shaped (or U-shaped) portion 108, which comprises a curved bottom 110 and two legs 112 that extend from the curved bottom and diverge from each other. The distal ends of the legs intersect with proximal ends of first and second support arm portions 114 of the wireform forming an angle therebetween. Typically, the intersections 115 of the legs of the V-shaped portion and the support arms are curved, each having a radius of about 0.375–0.50 inches or greater. The angle formed between the legs and arms is typically about 30–100 degrees, although smaller and larger angles are possible in variations of the device. Each support arm extends from its associated intersection at least a distance equal to the radius of the bicycle wheel to be held by the device, and is spaced from and parallel to the other support arm. Each arm terminates at the associated dropout 104.

The dropouts 104 include U-shaped slots 106 that are sized to receive the ends of a typical bicycle wheel axle therein. The dropouts are spaced from each other at the distal ends of support arm portions of the wireform at a distance generally corresponding to the width of a typical hub of a front bicycle wheel. The dropouts are attached to the wireform in any suitable manner such as welding, brazing, mechanical fastening and adhesive fastening. Further, the dropouts can be integrally formed with the wireform. For instance, a steel solid or tubular rod can be stamped to plastically deform the ends of the wireform into flattened dropouts. The slots can be formed during the stamping operation or they can be cut into the formed ends in a separate operation.

In the preferred embodiment, the V-shaped portion 108, the curved intersections 115 and some of the support arm portions 114 proximate the curved intersections are covered with a protective covering 116. In one variation, the covering comprises a dip coated polymeric covering. In another variation, the covering comprises flexible plastic or rubber tubing that is slid over the wireform and into place. The protective covering may comprise other materials as well including, but not limited to, fabric and leather. Further, the covering may be attached to the wireform using any other suitable method including but not limited to adhesive bonding and stitching.

Figure 2:
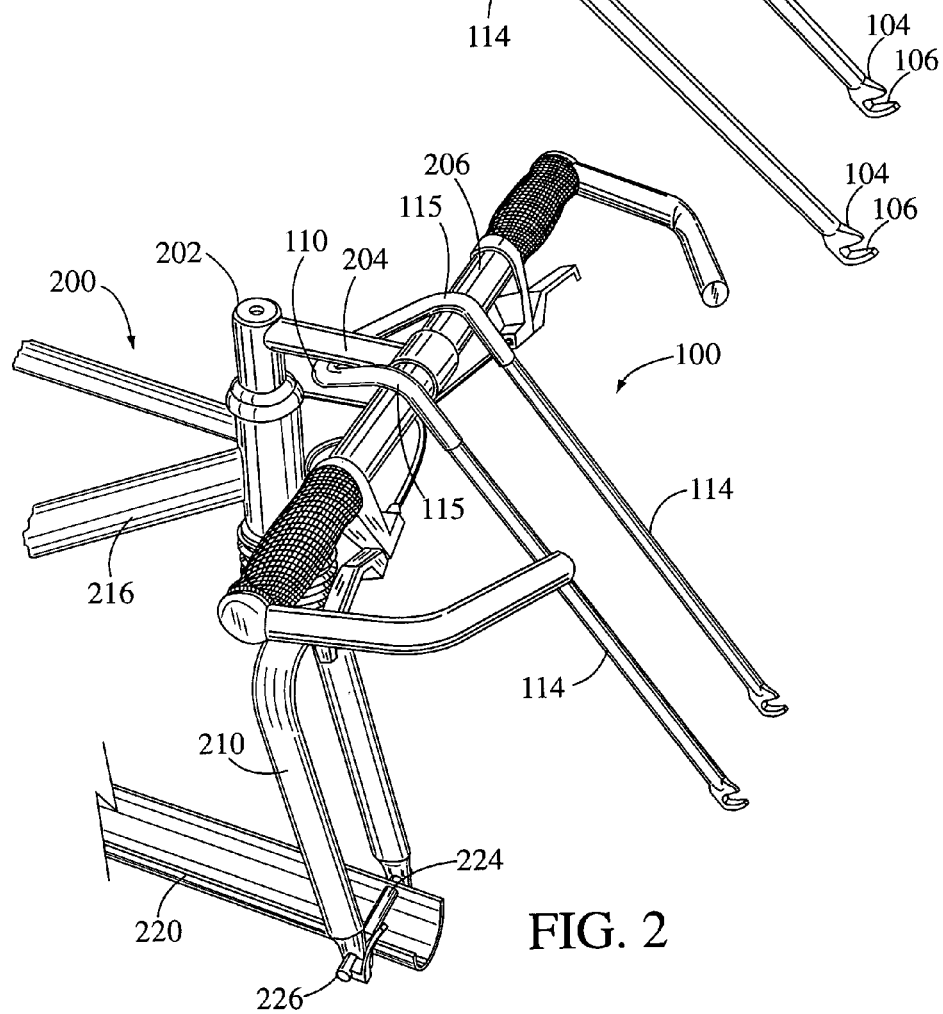
FIG. 2 is an isometric view of the preferred embodiment attached to a bicycle.
Figure 3:
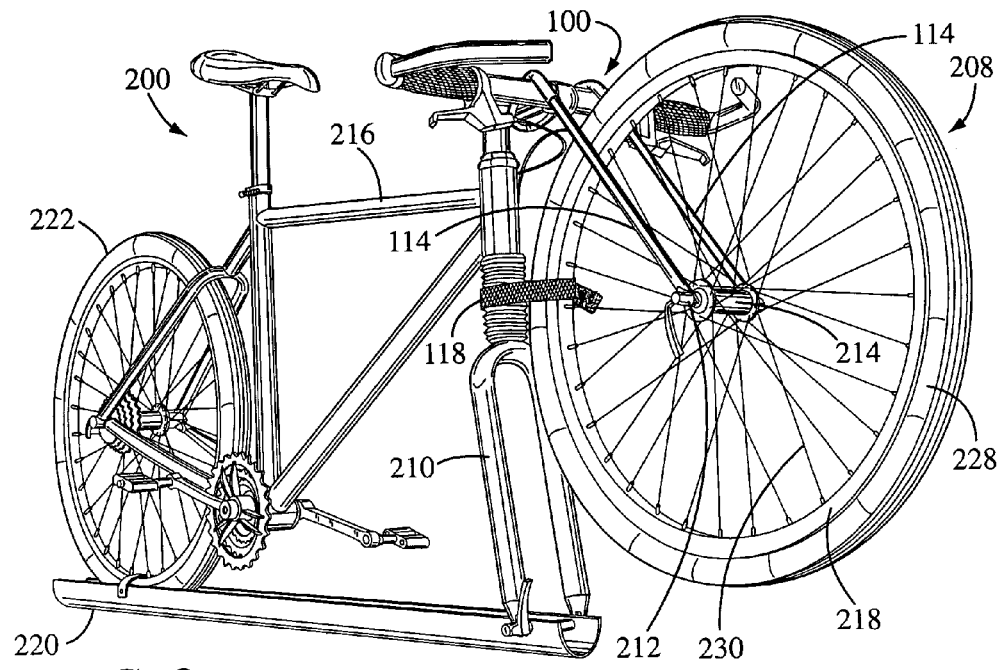
FIG. 3 is an isometric of the preferred embodiment attached to a bicycle with a wheel attached to the holding device.

Referring to FIGS. 2 and 3, the preferred embodiment device 100 is shown attached to a bicycle 200. The curved bottom 110 of the V-shaped portion 108 is braced against the underside of the extension section 204 of the bicycle's handlebar stem 202 while the curved intersections 115 rest on the topside of the handlebar 206. The support arms 114 extend forwardly from the handlebar. Accordingly, the device is prevented from pivoting downwardly about the handlebar by the curved bottom and the device is hindered from pivoting left and right by the two legs 112 of the V-shaped portion that are generally in contact with the side surfaces of the stem extension 204. It is appreciated that the preferred embodiment does not utilize a clamping mechanism comprising interconnected moving parts, such as a hinged clamp or an endless band clamp. By foregoing a clamping mechanism, the cost of fabricating the device is reduced. Further, the manner in which the preferred embodiment wheel holding device is braced against the handlebar or stem facilitates relatively rapid deployment and removal of the of the device and the associated wheel.

The front bicycle wheel 208 is (i) slid between the support arms 114, (ii) received into the spaced slots 106, and (iii) secured to the device in a manner similar to securing a front wheel to the dropouts of a bicycle's front fork 210. By tightening quick release skewers 212 or tightening a bolt (not shown) onto a threaded axle, the inside surfaces of the dropouts 104 are braced against the hub 214 to secure the wheel to the device. The weight of the wheel cantilevered by the support arms off of the top surface of the handlebar generally prevents the device from moving upwardly. However, when transporting the bicycle mounted on a rooftop bicycle rack of an automobile (the track 220 of a rooftop rack is partially illustrated in FIG. 3), bumps and imperfections in a roads surface can cause the front wheel and the device to bounce up and down. To stabilize the front wheel and the device and prevent undesirable movement of the front wheel, a strap 118 is provided to anchor the wheel to the bicycle. The strap is typically passed around the rim 218 of the wheel and around either the fork 210 or frame 216 of the bicycle. Preferably, the strap comprises hook and loop material to fasten it around the bicycle and the rim, although any suitable manner of securing the strap is acceptable including, but not limited to, buckles and D-rings. It is to be further appreciated that the strap may comprise any article used to stabilize the wheel including, but not limited to, cable, rope and twine.

A First Alternative Embodiment

Figure 4:
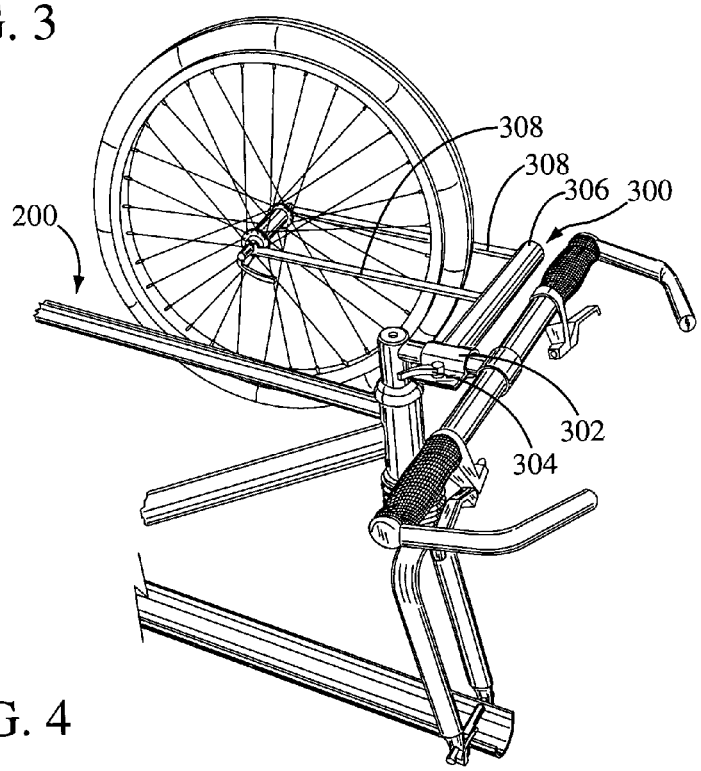
FIG. 4 is an isometric view of an alternative embodiment wheel holding device clamped to the stem extension of the bicycle with a wheel attached to the device.

Referring to FIG. 4 an alternative embodiment wheel holding device 300 for attaching to the stem 202 of a bicycle 200 is illustrated. The alternative embodiment device comprises a hinged clamp 302 that wraps around and locks against the extension portion 204 of the stem through a lever mechanism 304. In other variations of the alternative embodiment device the clamp can be sized and configured to attach to the handlebar 206. A leg 306 extends outwardly from the clamp from which two wheel support arms 308 append. The support arms are spaced from each other and each terminate at aligned slots (not clearly shown) in which the axle of a bicycle wheel 208 is received and is typically held in place by a quick release mechanism of the wheel.

A Method of Using the Device

Figure 5:
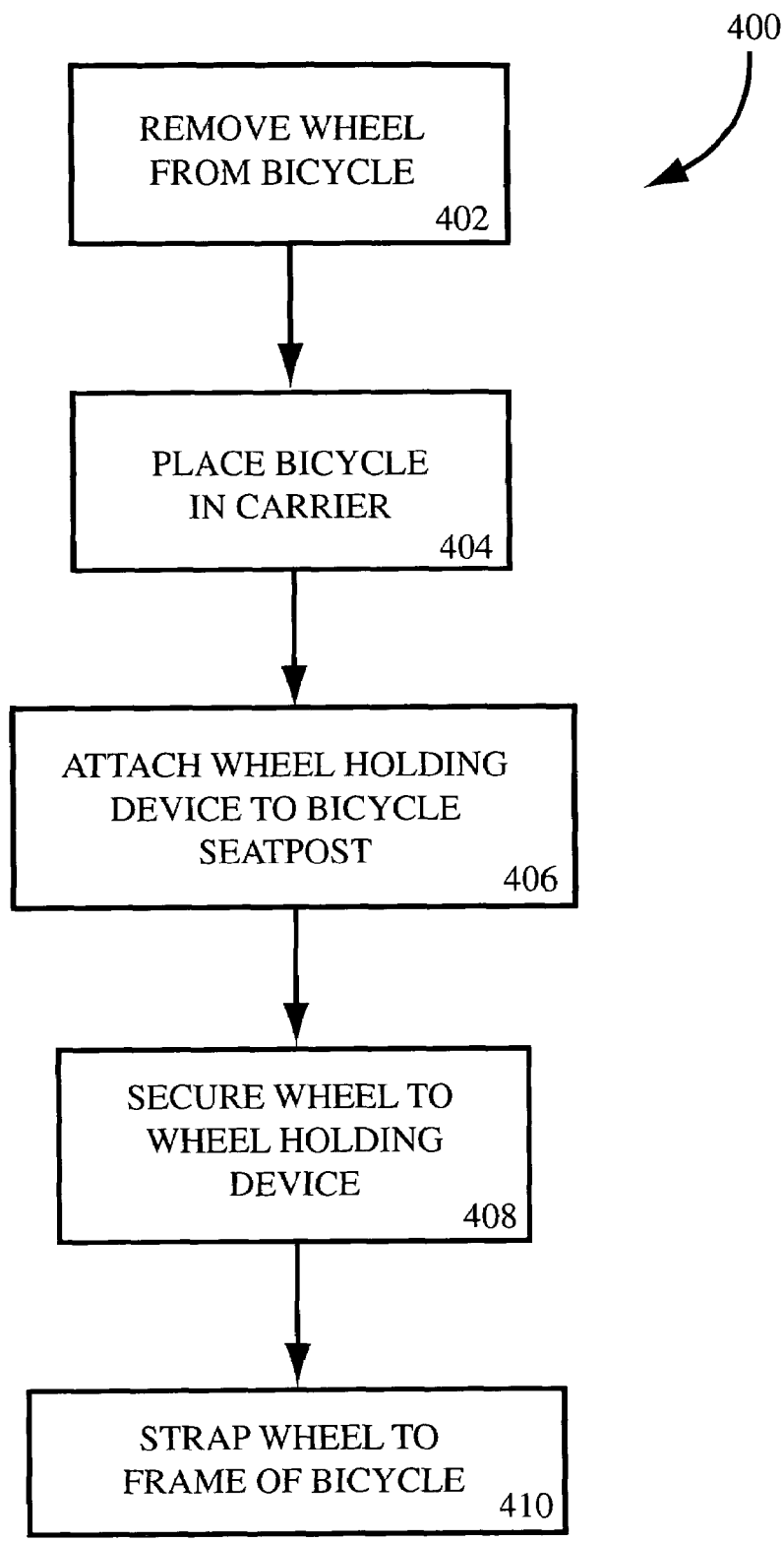
FIG. 5 is a flow chart illustrating a method of using a wheel holding device.

Referring to FIG. 5, flow chart 400 describes the preferred use of the bicycle wheel holder device in conjunction with a rooftop or similar rack for transporting a bicycle on an automobile.

First, as indicated in block 402, the front wheel 208 of the bicycle 200 is removed from the front fork 210 of the bicycle and is typically set aside. Next as indicated in block 404, the bicycle sans its front wheel is placed in the rooftop carrier. Typically, the rear wheel 222 is placed in a track 220 provided on the carrier and the dropout slots of the front fork are placed in a dummy axle 224 on the carrier. A quick release cam bolt 226 or nuts (not shown) are tightened to secure the front fork to the dummy axle.

As indicated in block 406, the wheel holding device is attached to one or both the stem 202 and handlebar 206. In the preferred embodiment, the curved bottom 110 of the V-shaped portion 108 is placed underneath the stem extension 204 in contact with the bottom side of the stem extension, and the intersections 115 between the support arms and the legs of the V-shaped portion are placed in contact with the topside of the handlebar. This configuration braces the device in place. The protective coating 116 of the device prevents the device from scratching or abrading either or both the handlebar and stem. Concerning the described alternative embodiment, the wheel holding device 300 is clamped to one of the handlebar and the stem.

Referring to block 408, the front wheel 208 of the bicycle 200 is secured to the wheel holding device. In both the preferred embodiment and the described alternative embodiment, the wheel is attached to the device at the axle of the wheel by clamping the axle to slotted dropouts via bolts or a quick release mechanism 212. In other variations and embodiments of the wheel holding device, the wheel can be secured to the holder by other suitable means such as, but not limited to, clamps or straps that restrain the rim 218, tire 228 and/or spokes 230 of the wheel to an appropriately configured wheel holding device.

Finally as indicated in block 410, the front wheel 208 is strapped to the frame 216 and/or fork 210 of the bicycle 200 as shown in FIG. 3 to prevent the wheel and wheel holding device combination from bobbing up and down during transport. It is appreciated that a strap 118 may not be required in all embodiments of the wheel holding device.

Although the method of securing a bicycle 200 and its front wheel 208 to a rooftop bicycle rack has been described with reference to the particular order of operations illustrated in FIG. 5, the actual order of operations can vary as would be obvious to one of ordinary skill in the art. For instance, the wheel holding device and the wheel could be secured to the bicycle before the bicycle is placed in the rooftop rack. Further, the same method may be applicable to other types of racks and accordingly, the described method is not intended to be limited just to use with rooftop racks but with any suitable type of rack where a wheel of the bicycle must be removed before securing the bicycle in the rack.

Other Alternative Embodiments

The preferred embodiment and alternative embodiment of the wheel holding device as illustrated in the accompanying figures and described herein are merely exemplary and are not meant to limit the scope of the invention. It is to be appreciated that numerous variations to the invention have been contemplated as would be obvious to one of ordinary skill in the art with the benefit of this disclosure. All variations of the invention that read upon the appended claim language are intended and contemplated to be within the scope of the invention.

For instance, the shape of the wireform could vary substantially along with the manner in which it braces against the handlebar or stem. A generally horizontal variation of the generally vertical attachment portion of the wireform disclosed in the concurrently filed and commonly owned U. S. patent application entitled "Seatpost Mounted Bicycle Wheel Holding Device" (Ser. No. 10/613,343) could be utilized to attach the wheel holding device to the stem extension. Further while the device has been primarily described with reference to a wireform, alternative embodiments need not utilize a wireform, rather any type of framework is suitable that facilitates the securing of a bicycle wheel to the bicycle in the manner required by the appended claims.

We claim:

1. A device for securing a bicycle wheel to a bicycle, the device comprising:

a generally u-shaped form having first and second arm portions extending from a base portion, the arm portions being spaced from each other generally proximate the base portion a sufficient distance to permit a handlebar stem of the bicycle to fit therebetween, the first and second arm portions terminating in first and second ends, the first and second end portions being spaced from each other, the first end having a first dropout attached thereto, the second end having a second dropout attached thereto, the first dropout having a first slot and the second dropout having a second slot, the first and second slots being substantially aligned with each other and adapted to receive the ends of an axle of the bicycle wheel therein.

2. The device of claim 1, wherein the form at least partially comprises a wireform.

3. The device of claim 1, wherein the form at least partially comprises tubular rod.

4. An assembly comprising the device of claim 1 and a strap, the strap adapted to wrap around both a portion of the bicycle wheel and the bicycle.

5. The device of claim 1:

wherein each arm portion (i) extends from the base portion a first distance to a first location, (ii) is bent at a first angle at the first location, and (iii) extends from the first location until terminating at the respective first or second dropout; and wherein each arm portion between the first location and the respective first or second dropout is substantially coplanar with the other arm portion.

6. The device of claim 5, wherein the first angle is between 30 and 100 degrees.

7. The device of claim 1, wherein form comprises at least one from the set of aluminum, steel, titanium, magnesium and reinforced plastic.

8. The device of claim 1, wherein the base portion is curved.

9. The device of claim 1, wherein the base portion and the arm portions proximate the base portion are coated with a polymeric material.

10. A device for attaching a bicycle wheel to a bicycle, the device comprising:
a generally V-shaped portion, the V-shaped portion including two legs;
first and second support leg portions, each support leg portion intersecting with an end of one of the legs of the V-shaped portion at a proximal end forming a first angle, each support leg portion extending from the proximal end to a distal end; and
first and second dropout portions, the first dropout portion being attached to the distal end of the first support leg portion, the second dropout portion being attached to the distal end of the second support leg portion, each of the first and second dropout portions including a slot formed therein for receiving a portion of an axle of the bicycle wheel, the slot of the first dropout portion being substantially aligned with the slot of the second dropout portion.

11. The device of claim 10, wherein the V-shaped portion and the first and second support leg portions comprise a wireform.

12. The device of claim 11, wherein the wireform comprises 0.375 to 0.50" diameter steel rod.

13. The device of claim 11, wherein the V-shaped portion is covered with a protective covering.

14. The device of claim 13, wherein the protective covering is a polymeric material.

15. The device of claim 10, wherein the first angle is about 30–100 degrees.

16. An assembly including (i) the device of claim 10, and (ii) the bicycle wheel with the ends of the axle of the bicycle wheel received into the slots of the first and second dropout portions, and (iii) the bicycle with the device braced against one or both the stem and handlebar of the bicycle.

17. The assembly of claim 16 including a strap, the strap passing around a rim of the bicycle wheel and a portion of the bicycle.

18. A device for attaching a bicycle wheel to a bicycle, the device comprising:
a framework adapted to attach to one or both of a stem and handlebar of the bicycle without a clamping mechanism that comprises interconnected moving parts; and
a wheel attachment mechanism coupled with the framework for securing the bicycle wheel to the device wherein the wheel attachment mechanism comprises a pair of spaced and aligned slots adapted to receive an axle of the bicycle wheel therein.

19. The device of claim 18, wherein the framework comprises a wireform.

20. A combination comprising:
a bicycle including a frame, a front fork pivotally connected to the frame, a handlebar stein connected to the front fork, a handlebar connected to the handlebar stem, and a rear wheel;
a bicycle rack adapted for mounting to an automotive vehicle, the bicycle being secured to the bicycle rack;
a front wheel of the bicycle removed from the front fork; and
a wheel holding device having at least first and second ends, the front bicycle wheel being secured to a first end and the second end being attached to at least one of the handlebar stem and the handlebar.

21. The combination of claim 20, wherein the second end comprises a framework adapted to attach to one or both a stem or handlebar of the bicycle without a clamping mechanism that comprises interconnected moving parts.

22. The combination of claim 20, wherein the first end comprises a pair of spaced and aligned slots adapted to receive an axle of the front wheel therein.

23. The combination of claim 20, wherein the second end comprises a clamp and said clamp is secured to the handlebar stem.

24. The combination of claim 20, wherein the from wheel is further secured to the bicycle by a strap.

25. The combination of claim 20, wherein the bicycle rack is mounted to a roof of the automotive vehicle.

26. The combination of claim 21, wherein the second end comprises a generally U-shaped portion.

27. The combination of claim 20, wherein the wheel holding device substantially comprises a wireform.

28. The combination of claim 20, wherein the wheel holding device comprises a single unitary piece.

* * * * *